(12) United States Patent
Chu

(10) Patent No.: US 10,291,382 B2
(45) Date of Patent: May 14, 2019

(54) INITIALIZING COMMUNICATION FOR MULTIPLE TRANSCEIVERS

(71) Applicant: ADTRAN, Inc., Huntsville, AL (US)

(72) Inventor: Fred Tze-Yu Chu, Madison, AL (US)

(73) Assignee: ADTRAN, Inc., Huntsville, AL (US)

( * ) Notice: Subject to any disclaimer, the term of this patent is extended or adjusted under 35 U.S.C. 154(b) by 37 days.

(21) Appl. No.: 15/786,729

(22) Filed: Oct. 18, 2017

(65) Prior Publication Data

US 2019/0116019 A1    Apr. 18, 2019

(51) Int. Cl.
*H04L 5/14* (2006.01)
*H04L 29/06* (2006.01)

(52) U.S. Cl.
CPC ............ *H04L 5/1438* (2013.01); *H04L 69/24* (2013.01); *H04L 69/26* (2013.01)

(58) Field of Classification Search
CPC .................................................. H04L 5/1438
See application file for complete search history.

(56) References Cited

U.S. PATENT DOCUMENTS

| | | | | |
|---|---|---|---|---|
| 7,532,666 B1* | 5/2009 | Rezvani | ................ | H04L 1/0041 375/222 |
| 2012/0219085 A1* | 8/2012 | Long | ....................... | H04L 25/14 375/295 |
| 2015/0215239 A1* | 7/2015 | Tzannes | .............. | H04L 12/5601 370/395.1 |
| 2015/0222326 A1* | 8/2015 | Cioffi | .................... | H04L 5/1438 370/201 |
| 2015/0318875 A1* | 11/2015 | Kuipers | ............... | H04B 1/0057 370/297 |

* cited by examiner

*Primary Examiner* — Steven H Nguyen
(74) *Attorney, Agent, or Firm* — Fish & Richardson P.C.

(57) ABSTRACT

Methods, systems, and computer readable medium for initializing communication for multiple transceivers. In one aspect, a method includes launching an initialization process of a first transceiver. The initialization process includes obtaining, for a second transceiver, a set of handshake information and inserting the set of handshake information of the second transceiver into one or more registers that are transmitted with first handshake information of the first transceiver during initialization of the first transceiver. The initialization process includes initiating a communications channel for the second transceiver over the same physical communications medium using the set of handshake information that was inserted into the one or more registers, including transmitting, by the first transceiver, the first handshake information of the first transceiver together with the set of handshake information for the second transceiver over the same physical communications medium using the given set of tones.

18 Claims, 4 Drawing Sheets

INITIALIZING COMMUNICATION FOR MULTIPLE TRANSCEIVERS

BACKGROUND

This specification relates to initializing communication for multiple transceivers.

The modern high speed communication transceiver such as G.fast and G.hn can operate using various physical mediums such as twisted-pair phone wire or coaxial cable. However, before multiple devices commence normal communication between each other, the devices complete a handshaking process, G.handshake. The handshaking process is a negotiation of acceptable communication parameters for each of the devices. The end result of the handshaking process is an established communication channel between the devices.

SUMMARY

In general, one innovative aspect of the subject matter described in this specification can be embodied in methods for initializing communication for multiple transceivers. One example computer-implemented method includes the actions of launching an initialization process of a first transceiver, where the initialization process uses a given set of tones to perform the initialization process. The initialization process includes obtaining, for a second transceiver that is connected to a same physical communications medium as the first transceiver and uses the given set of tones to perform the initialization process, a set of handshake information transferred by the second transceiver during the initialization process. The initialization process includes inserting the set of handshake information of the second transceiver into one or more registers that are transmitted with first handshake information of the first transceiver during initialization of the first transceiver. The initialization process includes initiating a communications channel for the second transceiver over the same physical communications medium using the set of handshake information that was inserted into the one or more registers, including transmitting, by the first transceiver, the first handshake information of the first transceiver together with the set of handshake information for the second transceiver over the same physical communications medium using the given set of tones.

Other embodiments of these aspects included corresponding systems and apparatus.

These and other embodiments can each, optionally, include one or more of the following features. In some aspects initiating a communications channel for the second transceiver over the same physical communications medium can include receiving a reply to the first handshake information that includes a different set of handshake information for the second transceiver. The different set of handshake information can be included in the one or more registers that are transmitted with the first handshake information used to initialize the first transceiver. Initiating a communications channel can include determining proposed communication parameters that the second transceiver will use to communicate with a remote transceiver over the communications channel established for the second transceiver based on the set of handshake information and the different set of handshake information. The first transceiver can transmit the proposed communication parameters for the second transceiver.

In some aspects initiating the communications channel for the second transceiver can include receiving, by the first transceiver, an acceptance of the proposed communication parameters. In addition, initiating the communications channel for the second transceiver can include initiating independent communication between the second transceiver and a respective transceiver within the remote transceiver.

In some aspects, obtaining a set of handshake information transferred during the initialization process, can include requesting, by the first transceiver and from the second transceiver, the set of handshake information of the second transceiver, wherein the request includes a time period specifying an amount of time for the second transceiver to transmit the set of handshake information.

In some aspects, obtaining a set of handshake information transferred during the initialization process can also include requesting, in parallel with the request from the second transceiver and from a third transceiver, a second different set of handshake information of the third transceiver.

In some aspects handshake information can include parameters for establishing data transfer protocols between two or more transceivers.

Some devices include multiple transceivers and communicate with other devices that also have multiple transceivers. The devices with multiple transceivers can communicate with each other using one transmission medium. For example, when using one transmission medium, low-frequency transceivers use the transmission medium's lower frequency band to communicate as opposed to high-frequency transceivers that use the transmission medium's higher frequency band. Due to reliability constraints that develop because of crosstalk, the handshaking process uses lower frequency signals passed through the lower part of the frequency band. However, this makes higher frequency transceivers need to use the lower frequency band dedicated to the lower frequency transceiver to execute the handshaking process. This either leaves the higher frequency transceiver without a frequency band to use during the handshaking process or requires the lower frequency transceiver to vacate the lower frequency band so the higher frequency transceiver can complete the handshaking process with another transceiver. Completing individual handshaking processes for each of the multiple transceivers can require more time than systems that implement the features described below.

Particular embodiments of the subject matter described in this specification can be implemented so as to realize one or more of the following advantages. Techniques described herein allow for multiple transceivers to simultaneously execute the handshaking process using a single set of handshake tones. For example, the handshake information used to initialize a particular transceiver can be inserted into (e.g., nested with) the initialization information that is used to initialize a different transceiver, thereby enabling the initialization information for both transceivers to be sent over the same set of tones at the same time. By nesting handshake information for multiple transceivers, one transceiver transmits the initialization information for multiple different transceivers over the same set of tones, thereby enabling multiple different transceivers to be initialized without interfering with the operation of other transceivers that share the same physical communications medium. Enabling a single transceiver to simultaneously transmit initialization information for multiple different transceivers over the same communications medium enables multiple transceivers that operate within different frequency bands to be initialized at the same time, thereby reducing interference and/or communications errors that would be injected into the system if the transceivers attempted to separately perform their own respective initialization processes.

While some aspects of this disclosure generally describe computer-implemented software embodied on tangible media that processes and transforms data, some or all of the aspects may be computer-implemented methods or further included in respective systems or devices for performing the described functionality. The details of one or more embodiments of the subject matter described in this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1A:
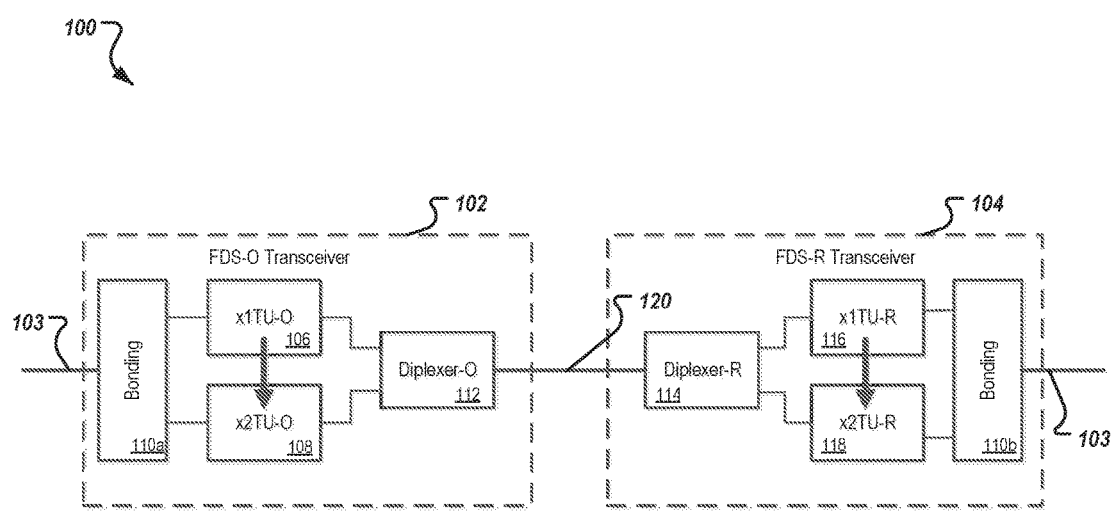
FIG. 1A is a block diagram illustrating an example environment in which two frequency division systems communicate over a same physical communications medium.

The present disclosure describes methods, systems, and apparatus for simultaneously initializing communication for multiple transceivers, for example, by using one transceiver to transmit and/or receive the initialization information for multiple transceivers. One portion of the initialization process is the handshake process. The handshake process is used to establish a communication channel between two or more transceivers. As described in detail throughout this document, during the handshake process a single transceiver transmits handshake information for multiple transceivers over a same physical communication medium. In addition, the single transceiver uses a single tone set to conduct the handshake process for multiple transceivers, such that the handshake information for multiple different transceivers are transmitted over that single tone set at the same time. Thus, each transceiver can establish a communication channel between a respective one or more transceivers at the same time as the single transceiver.

In operation, a particular transceiver that is launching an initialization process can receive a set of handshake information for one or more other transceivers. The particular transceiver embeds the received set of handshake information in shadow registers of a G.handshake (G.hs) message generated by the first transceiver to initiate the handshake process. Thus, the particular transceiver modifies the G.handshake message to include not only the particular transceiver's handshake information, but also the set of handshake information for the one or more other transceivers.

The particular transceiver sends the modified G.handshake message to a corresponding transceiver (e.g., a transceiver with which the particular transceiver is establishing a communications channel) over a single set of tones, e.g., using a low-frequency carrier signal. In some implementations, the particular transceiver may transmit the modified G.handshake message over a low-frequency band that is dedicated to transferring handshake information during the handshake process (e.g., as specified by G.994.1). As described in more detail below, the corresponding transceiver to which the particular transceiver sends the modified G.handshake message (or another type of modified handshake message), can extract, from the modified G.handshake message, the set of handshake information for the one or more other transceivers, and pass that extracted handshake information to one or more corresponding transceivers with which the one or more other transceivers are establishing a communications channel. Meanwhile, the corresponding transceiver that receives the G.handshake information can use the handshake information from the particular transceiver to generate a handshake reply.

The corresponding transceiver can also receive a set of other handshake replies from the one or more other corresponding transceivers, and embed the set of other handshake replies into the handshake reply being generated by the corresponding transceiver. For example, the set of other handshake replies can be inserted into shadow registers of the handshake reply, in a manner similar to that by which the set of handshake information was embedded into the G.handshake message, to create a modified handshake reply. This modified handshake reply, which includes handshake reply information for multiple different transceivers, is then transmitted back to the particular transceiver to advance the handshake process for each of the multiple different transceivers. Further transmissions between the particular transceiver and the corresponding transceiver can continue to carry information that facilitates and/or completes the handshake process between different pairs of the multiple different receivers, thereby enabling multiple different pairs of transceivers to simultaneously utilize a same set of tones to carry out the handshake and/or initialization process.

FIG. 1A is a block diagram illustrating an example environment 100 in which two frequency division systems communicate over a same physical communications medium. The environment 100 includes Frequency Division System (FDS-O) 102 and Frequency Division System (FDS-R) 104, communicating over a communication medium 120. The two frequency division systems communicate using multiple different transceivers that each utilize different frequency bands to communicate. One of the transceivers (e.g., x2TU-O 108) can be used to implement lower frequency digital subscriber line (DSL) technologies, for example, asymmetric digital subscriber line (ADSL) G.992.1, ADSL2plus G.992.5, very high speed digital subscriber line (VDSL) G.993.2, or vectored VDSL G.993.5, while another transceiver (e.g., x1TU-O 106) in the frequency division system (e.g., FDS-O 102) can be used to implement higher frequency technologies, such as G.fast.

To establish communications channels, the FDS-O 102 and the FDS-R 104 complete an initialization process to enter showtime. Showtime is a state the FDS-O 102 and the FDS-R 104 reach after the initialization process is completed. During showtime, the FDS-O 102 and the FDS-R 104 transmit bearer channel data.

The FDS-O 102 and the FDS-O 104 respectively include bonding units 110a, b. The Bonding unit 110a provides data to the two transceivers x1TU-O 106 and x2TU-O 108 of FDS-O 102. Likewise, the bonding unit 110b provides data to transceivers x1TU-R 116 and x2TU-R 118. Transceivers x1TU-O 106 and x2TU-O 108 are coupled to diplexer-O 112. The diplexer-O 112 aggregates signals received from transceivers x1TU-O and x2TU-O. Furthermore, diplexer-R 112 receives and transmits data to transceivers x1TU-R 116 and x2TU-R 118 over the communication medium 120. As such, multiple different transceiver pairs utilize the same communication medium 120 to carry data. As discussed in more detail below, this same communication medium 120 is also used to initialize multiple different communications channels between different pairs of transceivers.

The FDS-O 102 includes two additional transceivers x1TU-O 106 and x2TU-O 108. In some implementations, the two transceivers x1TU-O 106 and x2TU-O 108 operate in different frequency bands. For example, and in this instance, transceiver x1TU-O 106 is a low-frequency transceiver, for example, an ADSL or VDSL transceiver. Transceiver x1TU-O 106 can have a dedicated frequency band below 17.6 MHZ. In addition, tone sets used during the handshake process, defined in G.994.1, use low-frequency bands below 2 MHz. The tone sets are carrier frequencies the transceivers use to execute the handshaking process.

Also in this instance, transceiver x2TU-O 108 is a high-frequency transceiver, for example, a G.fast transceiver. Transceiver x2TU-O 108 transmits data in a high-frequency band. For example, high-frequency transceivers transmit data above 17.6 MHz. However, high-frequency transceivers also execute the handshake process, defined in G.994.1, within a frequency band below 2 MHz.

The FDS-R 104 includes two transceivers x1TU-R 116 and x2TU-R 118. In this instance, transceiver x1TU-R is a low-frequency transceiver and transceiver x2TU-R is a high-frequency transceiver. During showtime, low-frequency transceiver x1TU-O 106 transmits data to low-frequency transceiver x1TU-R 116 using a lower frequency band. Moreover, during showtime high-frequency transceiver x2TU-O transmits data to high-frequency transceiver x2TU-R 118 using a higher frequency band.

FDS-O 102 and FDS-R 104 respectively include diplexers, diplexer-O 112 and diplexer-R 114. A diplexer is a multiplexer that receives two input signals and combines or multiplexes these two input signals into one signal. In some implementations, a diplexer 112,114 aggregates multiple input signals into one output signal. In other implementations, the diplexer 112, 114 receives one input signal and separates the input signal into multiple output signals. In particular, the diplexer includes a high-pass filter and a low-pass filter. In this instance, the high-pass filter can be configured to pass signals in frequency bands above 17.6 MHz to the high-frequency transceivers. Meanwhile, the low-pass filter can be configured to pass signals in frequency bands below 17.6 MHz to the low-frequency transceivers.

For example, diplexer-O 112 can receive input signals from transceivers x1TU-O 106 and x2TU-O 108 that are multiplexed into an output signal. The two input signals are each within a different frequency band e.g., a low-frequency band and a high-frequency band. The output signal can be transmitted to transceiver FDS-R 104.

FDS-R's diplexer-R 114 segregates the high-frequency signal and the low-frequency signal using the low-pass and high-pass filters within the diplexer-R 114. The low-frequency signal is transmitted from the diplexer-R 114 to the low-frequency transceiver x1TU-R. The high-frequency signal is transmitted from the diplexer-R 114 to the high-frequency transceiver x2TU-R 118. In some implementations, the diplexer can be replaced with a triplexer, a quadplexer, or any other suitable multiplexer.

In this instance, the four transceivers x1TU-O 106, x2TU-O 108, x1TU-R 116 and x2TU-R 118 and use two different frequency bands to transmit data over the same communication medium 120. However, in some implementations, the two transceivers can also use the same frequency band to transmit data. For example, x1TU-O 106 and x2TU-O 108 can both be low-frequency transceivers or high-frequency transceivers. If the two transceivers communicate using the same frequency band, the transceivers will need to mitigate conflicting signals sent over the same frequency. For example, the two transceivers x1TU-O 106 and x2TU-O 108 can use two separate and uniquely dedicated communication mediums, or alternating sending the messages between the two transceivers causing latency delays in data transmission.

Before transceivers x1TU-O and x2TU-O enter showtime and transmit data to x1TU-R and x2TU-R respectively, the transceivers conduct an initialization process. The initialization process includes a handshake process based on G.994.1 (G.hs). The handshake process creates a communication channel, for example, the bearer channel, between the two transceivers. The bearer channel is the channel transmits data between two transceivers during showtime.

The handshake process uses dedicated tone sets to start communication between transceivers x1TU-O, x2TU-O and x1TU-R, x2TU-R respectively. However, since the high-frequency transceivers use the lower frequency band to conduct the handshake process, while the lower frequency transceivers use the lowers frequency band to communicate data, it is difficult for the four transceivers to use the same communication medium 120 to transmit handshake information. This is because both sets of transceivers, i.e., the low frequency and the high frequency, simultaneously try to transmit data using the low-frequency band of the communication medium and a conflict of signal transmission occurs. To rectify this problem, one pair of transceivers will be used to facilitate the handshake process for two or more different pairs of transceivers.

For example, the low-frequency transceivers, x1TU-O 106 and x1TU-R 116, can facilitate the handshake process for the low-frequency transceivers as well as the high-frequency transceivers. In this instance, transceivers x1TU-O 106 and x1TU-R 116 conduct the handshake process for themselves according to G.994.1, and transmit handshake information for high-frequency transceivers x2TU-O 108 and x2TU-R 118. In some implementations, the high-frequency transceivers, x2TU-R, x2TU-O, can transmit handshake information for the low-frequency transceivers according to description provided herein. Any transceiver pair can execute the handshake process for one or more other transceiver pairs.

Figure 1B:
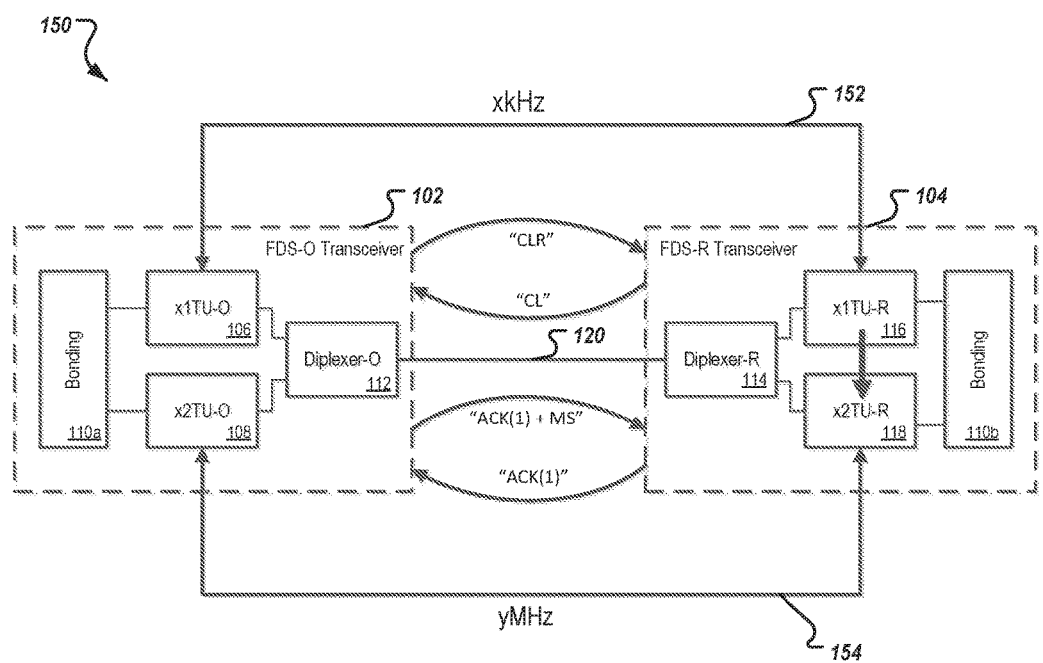
FIG. 1B is a block diagram illustrating simultaneous transmission of handshake information for multiple transceivers.
Figure 3:
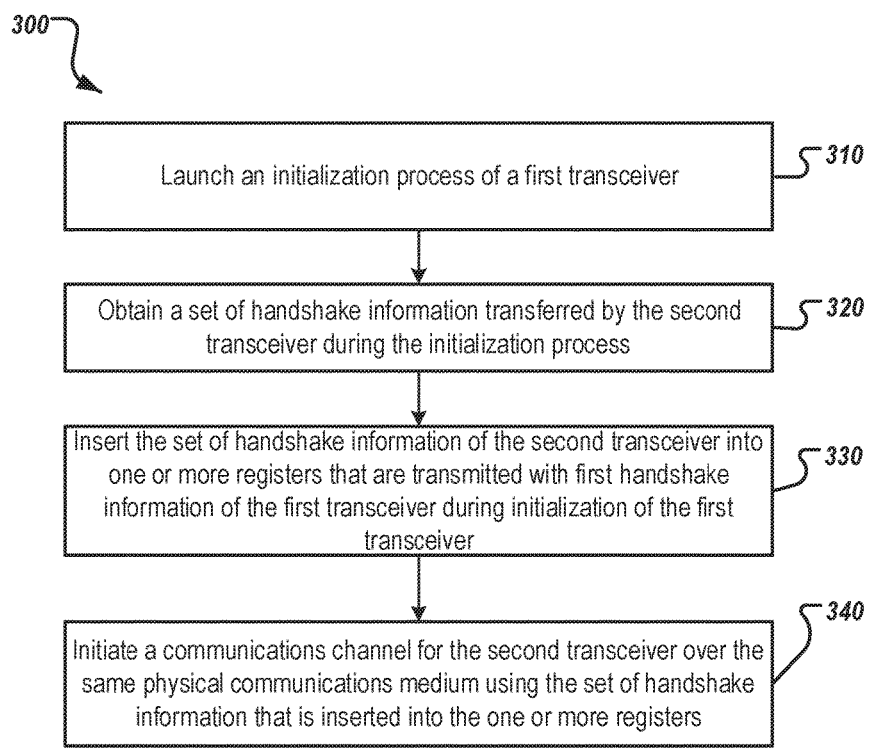
FIG. 3 is a flow chart of an example process for simultaneously transmitting handshaking information for multiple transceivers.

FIG. 1B is a block diagram illustrating simultaneous transmission of handshake information for multiple transceivers. FIG. 1B illustrates one implementation of example message transfers between multiple transceivers. Aspects of FIG. 3 will be described in connection with FIG. 1B. FIG. 3 is a flow chart of an example process for simultaneously transmitting handshaking information for multiple transceivers.

The transceivers simultaneously execute the handshake process by expanding the G.handshake (G.hs) field in x1TU-O's G.hs message to include transceiver x2TU-O's handshake information, which is also referred to as a set of handshake information to distinguish it from the handshake information of x1TU-O. Handshake information includes parameters for establishing data transfer protocols between two or more transceivers. The data transfer protocols are available modes of operation for a particular transceiver, which describes how the particular transceiver can transmit data. For example, the data transfer protocols can include upstream frequency spectrums, downstream frequency spectrums, vendor identification, which version of G.994.1 the specific equipment uses, etc.

Transceiver x1TU-O's handshake message includes the set of handshake information for transceiver x2TU-O 108. Thus, transceiver x1TU-O 106 simultaneously executes the handshake process for the low-frequency transceivers, x1TU-O 106, x2TU-O 108 and the high-frequency transceivers x1TU-R 116, x2TU-R 118 using the same handshake message.

For example, and referring to FIG. 3, an initialization process of a first transceiver is launched (310). In some implementations, the initialization process can be launched, for example, when the first transceiver or FDS-O 102 is powered on or after the transceiver is reset. In this example, the particular transceiver is a low-frequency transceiver x1TU-O 106, but the initialization process could alternatively be launched for the high-frequency transceiver. The initialization process uses a given set of tones to perform the initialization process. For example, the low-frequency transceiver x1TU-O 106 uses one of the tones according to G.994.1 (G.hs). The tones communicate at a frequency less than 2 MHz. Note that the specific example tones referred to here are provided for purposes of illustration only and other tones defined in G.994.1 can also be used.

The process obtains a set of handshake information for a second transceiver that is connected to a same physical communications medium as the first transceiver (320). In some implementations, the obtained set of handshake information includes the handshake information that is transmitted by the second transceiver during execution of the initialization process by the second transceiver. In this example, the second transceiver is transceiver x2TU-O 108, which is connected to a same physical communications medium 106 as the first transceiver, x1TU-O 106. In addition, the second transceiver uses the given set of tones to perform the initialization process, for example, the G.994.1 (G.hs) tones used by x1TU-O 106.

The first transceiver can obtain the first set of handshake information from the second transceiver in response to the first transceiver requesting the first set of handshake information. For example, when the initialization process is launched, the first transceiver can access stored data specifying that the first transceiver is to obtain, from the second transceiver, information that will be embedded into the handshake message that will be transmitted by the first transceivers. In response to accessing the stored data, the first transceiver can generate a request for handshake information requesting that the second transceiver provide its handshake information to the first transceiver, and the second transceiver can respond to the request for handshake information with the set of handshake information that is used to initialize the second transceiver.

In some implementations, the request for the handshake information specifies a time period describing an amount of time within which the second transceiver must transmit the set of handshake information to the first transceiver. In some implementations, if the first transceiver does not receive the handshake information within the specified time period, the first transceiver sends a subsequent request to the second transceiver (e.g., a retry message). However, in other implementations, if the first transceiver does not receive the handshake information, the first transceiver continues the handshake process for the first transceiver without the handshake information from the second transceiver.

In some implementations, the first transceiver can transmit, in parallel with the request for the set of handshake information from the second transceiver, a request for handshake information from a third transceiver that differs from the second transceiver. Any handshake information received from the third transceiver can also be embedded in the handshake message being generated by the first transceiver, such that the first transceiver can simultaneously facilitate the handshake process for a plurality of transceivers using the same handshake message. For example, the first transceiver can embed handshake information for N (e.g., two or more) different transceivers into its own handshake message to create a modified handshake message, and transmit that modified handshake message using a same set of tones.

The first transceiver 106 inserts the set of handshake information of the second transceiver 108 into one or more registers (e.g., shadow registers) of the handshake message generated by the first transceiver 106. As such, the set of handshake information of the second transceiver 108 is transmitted with first handshake information of the first transceiver 106 during initialization of the first transceiver 106 (330). The registers are frames included in a message frame structure according to G.994.1. The handshake process is carried out by sending messages with the additional handshake information embedded in the message frames of the first transceiver 106. Further details regarding the message frame structure will be described in connection with FIG. 2.

A communications channel is initiated for the second transceiver 108 over the same physical communications medium using the set of handshake information that is inserted into the one or more registers (340). In some implementations, the communications channel for the second transceiver 108 is initiated over the same physical medium 106 as the communications channel for the first transceiver 106. The communications channel for the second transceiver 108 is initiated, in part, by the first transceiver 106 transmitting the first handshake information of the first transceiver together with the set of handshake information for the second transceiver using the given set of tones.

For example, referring back to FIG. 1B, transceiver x1TU-O 106 transmits a "CLR" message to transceiver x1TU-R 116. The "CLR" message is a request for a capabilities list for transceiver x1TU-R 116. In addition, the "CLR" message includes a capabilities list for transceiver x1TU-O 106. A capabilities list specifies parameters and modes of operation that a given transceiver can utilize. In some implementations, the modes of operation describe the transceiver's different communication protocols used to communicate with other transceivers. The "CLR" message can also include a capabilities list for transceiver x2TU-O 108, which can be embedded in registers of the "CLR" message transmitted by transceiver x1TU-O 106. For example, a "CLR" message that is transmitted by low-frequency transceiver x1TU-O 106 to low-frequency transceiver x1TU-R 116 can have information from a different "CLR" message (e.g., generated by a different transceiver) embedded in the registers of the "CLR" message transmitted by the transceiver x1TU-O 106, which is referred to as the first "CLR" message. The different "CLR" message that is embedded in the registers of the first "CLR" message can be generated by and/or received from a high-frequency transceiver x2TU-O 108. This additional "CLR" message can be, for example, the "CLR" message that the high-frequency transceiver x2TU-O 108 would have transmitted directly to high-frequency transceiver x2TU-R 118 using a traditional handshake process. as such, the information that is embedded into the first "CLR" message can include a capabilities list for the high-frequency transceiver x2TU-O 108, which specifies parameters and modes of operation for x2TU-O 108.

A controller in FDS-R 104 parses the "CLR" message and determines that registers of the "CLR" message received by x1TU-R includes a capabilities list for the high-frequency transceiver x2TU-R 118. For example, assuming that the high-frequency transceiver x2TU-O 108 generated its own "CLR" message, which was then embedded in the registers of the first "CLR" message generated by x1TU-O 106, the controller can extract the "CLR" message generated by high-frequency transceiver x2TU-O 108, and transfer that extracted "CLR" message to high-frequency transceiver x2TU-R 118. In this example, the controller can send instructions to low-frequency transceiver x1TU-R 116 that instruct x1TU-R 116 to transmit information embedded in the registers of the first CLR message received from x1TU-O 106 (e.g., the different "CLR" message generated by high-frequency transceiver x2TU-O 108) to high-frequency transceiver x2TU-R 118. In some implementations, the controller is separate and distinct from each transceiver x1TU-R 116 and x2TU-R 118. In other implementations, each transceiver includes an internal controller that can parse messages and give its transceiver instructions. In this example, transceiver x2TU-R 118 receives the information, and responds based on the received information. For example, the different "CLR" message (e.g., generated by high-frequency transceiver x2TU-O 108) can be passed from transceiver x2TU-O 108 to transceiver x2TU-R 118, which in turn, can generates a "CL" message for transceiver x2TU-O 108.

A "CL" message is a response message generated in response to receiving a portion or a whole "CLR" message. The "CL" message conveys a list of possible modes of operation for the transceiver that generates the "CL" message. In some implementations, the "CL" message specifies modes of operation that can be used by both of the communicating transceivers, for example, high-frequency transceivers x2TU-O 108 and x2TU-R 118. For example, high-frequency transceiver x2TU-R 118 can receive the "CLR" message generated by x2TU-O 108 and determine which modes of operation listed in the "CLR" message generated by x2TU-O 108 can also be used by high-frequency transceiver x2TU-R 118. Based on the determination, x2TU-R 118 generates the "CL" message that specifies one or more of the possible modes of operation that can be used by both of high-frequency transceiver x2TU-O 108 and high-frequency transceiver x2TU-R 118.

The initiation of the communications channel for the second transceiver over the same physical communications medium, can include, the first transceiver x1 TU-O 106 receiving a reply to the first handshake information. For example, low-frequency transceiver x1TU-O 106 receives a "CL" message from low-frequency transceiver x1 TU-R 116. The reply. "CL" message includes a second set of handshake information for the second transceiver, e.g., the high-frequency transceiver x2TU-O 108. The second set of handshake information is included in the one or more registers of handshake information used to initialize the first transceiver. In particular, similar to the discussion of the "CLR" message above, high-frequency transceiver x2TU-R's "CL" message can be embedded into registers of a different "CL" message that is generated by the low-frequency transceiver x1TU-R 116 embeds.

The initiation of the communications channel for the second transceiver over the same physical communications medium can also include determining proposed communication parameters that the second transceiver will use to communicate with a remote transceiver over the communications channel established for the second transceiver. The proposed communication parameters can be selected, for example, based on the first set of handshake information and the second set of handshake information. For example, each transceiver, the low-frequency transceiver x1TU-O 106 and high-frequency x2TU-O 108, determines proposed common modes of operation to communicate with their respective low and high-frequency transceivers x1TU-R 116. Each transceiver, the low-frequency transceiver x1TU-O 106 and high-frequency x2TU-O 108 determines the proposed common modes of operation based on the "CLR" message and the "CL" message.

The low-frequency transceiver x1TU-O 106 and high-frequency x2TU-O 108 each generate an "ACK (1)+MS" message. An "ACK (1)+MS" message includes two different components in one message. The "ACK (1)" portion acknowledges receiving a portion or a complete "CL" message. The "MS" component is a mode select message that requests the initiation of a particular mode of operation for showtime. Again, the low-frequency transceiver x1TU-O 1206 embeds high-frequency transceiver x2TU-O's "ACK (1)+MS" message inside of the registers of its own handshake message.

The first transceiver transmits the proposed communication parameters for the second transceiver. For example, low-frequency transceiver x1TU-O 106 transmits an acknowledgement message that includes two "ACK (1)+MS" messages, one for low-frequency transceiver x1TU-O 106 and one for high-frequency transceiver x2TU-O 108.

Low-frequency transceiver x1TU-R 116 and high-frequency transceiver x2TU-R 118 individually receive their respective "ACK (1)+MS" messages. For example, the "ACK(1)+MS" message for the high-frequency transceiver x2TU-R 118 can be extracted from the acknowledgement message that is received by the low-frequency transceiver x1TU-R 116, and provided to the high-frequency transceiver x2TU-R 118 (e.g., by a controller). Low-frequency transceiver x1TU-R 116 and high-frequency transceiver x2TU-R 118 each generate respective "ACK (1)" messages. In this instance, the "ACK(1)" message acknowledges receiving a partial or complete "MS" message and initiates the G.994.1 clear-down procedure. High-frequency transceiver x2TU-R's "ACK (1)" message is embedded into the registers of low-frequency transceiver x1TU-R's "ACK" 1 message. Low-frequency transceiver x1TU-R transmits the "ACK (1)" message for both transceivers to low-frequency transceiver x1TU-O 106 in a same message.

The first transceiver receives an acceptance of the proposed communication parameters. For example, the low-frequency transceiver x1TU-O 106 receives the "ACK (1)" message from low-frequency transceiver x1TU-R 116. The low-frequency transceiver x1TU-O 106 transmits the "ACK (1)" message from high-frequency transceiver x2TU-R 118 to high-frequency transceiver x2TU-O 108.

The low-frequency transceiver x1TU-O 106 initiates low-frequency communication 152 with low-frequency transceiver x1TU-R 1106 using the communication medium 120. Likewise, independent communication is initiated between the second transceiver and a respective transceiver within the remote transceiver. For example, the high-frequency transceiver x2TU-O 108 initiates high-frequency communication 154 with high-frequency transceiver x2TU-R 118 using the same communication medium 120 as the low-frequency communication 152.

Figure 2:
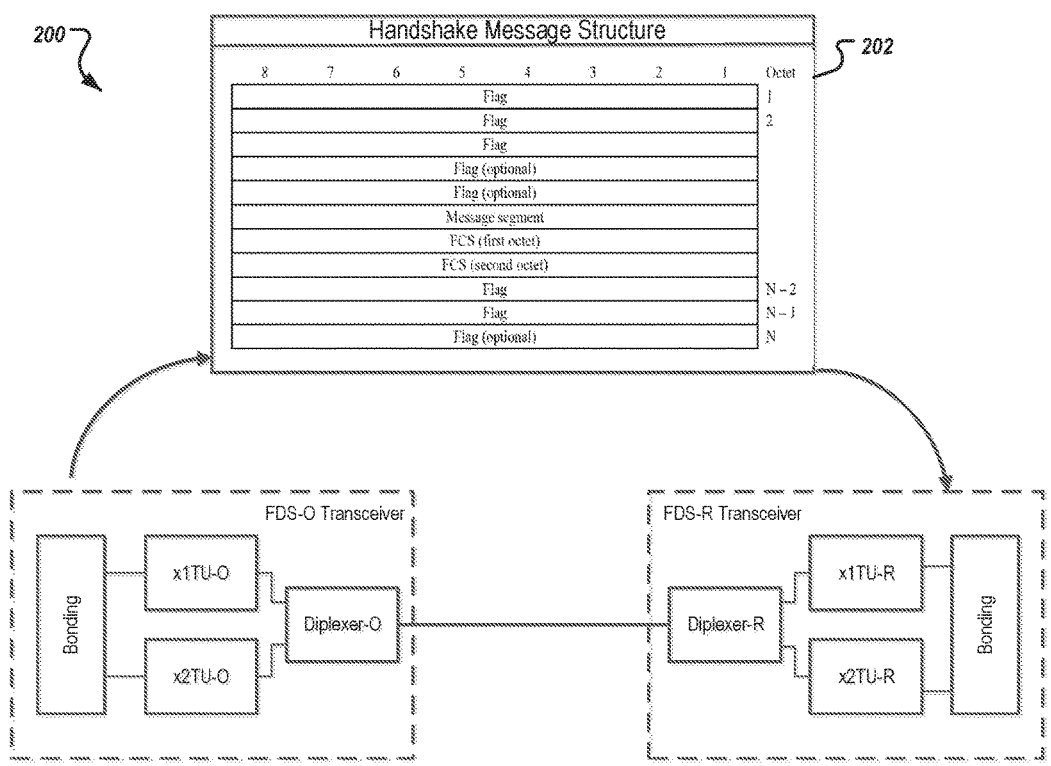
FIG. 2 is a block diagram depicting a handshake message frame structure.

FIG. 2 is a block diagram depicting a handshake (G.hs) message frame 202 structure. This corresponds to a high-level data control (HDLC) frame 202 structure, wherein each frame begins and ends with a standard HDLC flag octet ("01111110"). Each G.hs message makes up one or more frames 202. Low-frequency transceivers x1TU-O 106, x1TU-R 116 embed handshake information for high-frequency transceivers x2TU-O 108, x2TU-R 118 in empty registers or frames 202 of the G.hs message. For example, a low-frequency transceiver x1TU-O 106, x1TU-R 116 may add additional frames 202 to the G.hs message to include the G.hs message of the high-frequency transceiver x2TU-O 108, x2TU-R 118.

In order to identify the messages that are directed to the high-frequency transceivers, a unique MAC address or an IDS (identity sequence) may be used in the G.994.1 identification field that are dedicated to the individual transceivers (e.g., for the initialization process).

As an example, a message frame may include a destination MAC address (MAC address of the G.994.1 process of the destination high-frequency transceiver), a source MAC address (MAC address of the G.994.1 process of the source high-frequency transceiver), a length field (as per the IEEE 802.3 MAC frame format), a logic link control header coding for the subnetwork access protocol (3 bytes, AA-AA-03), a subnetwork access protocol data unit header containing a 3-octet organization code and a 2-octet Protocol ID for a private protocol, a Protocol Payload Data (G.994.1 HDLC frame including Flags, Message segment, frame check sequence (FCS)), and a standard Ethernet 4-byte FCS (as per the IEEE 802.3 Ethernet frame FCS).

The high-frequency transceivers x2TU-O 108, x2TU-R 118 may then exchange G.hs messages using the message frames described above. The G.hs protocol may remain unchanged including messages transmitted during the handshake process.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A method, comprising:
launching an initialization process of a first transceiver, wherein the initialization process uses a given set of tones to perform the initialization process;
obtaining, for a second transceiver that is connected to a same physical communications medium as the first transceiver and uses the given set of tones to perform the initialization process, a set of handshake information transferred by the second transceiver during the initialization process;
inserting the set of handshake information of the second transceiver into one or more registers that are transmitted with first handshake information of the first transceiver during initialization of the first transceiver; and
initiating a communications channel for the second transceiver over the same physical communications medium using the set of handshake information that was inserted into the one or more registers, including transmitting, by the first transceiver, the first handshake information of the first transceiver together with the set of handshake information for the second transceiver over the same physical communications medium using the given set of tones.

2. The method of claim 1, wherein initiating a communications channel for the second transceiver over the same physical communications medium, comprises:
receiving, by the first transceiver, a reply to the first handshake information that includes a different set of handshake information for the second transceiver, wherein the different set of handshake information is included in the one or more registers that are transmitted with the first handshake information used to initialize the first transceiver;
determining, based on the set of handshake information and the different set of handshake information, proposed communication parameters that the second transceiver will use to communicate with a remote transceiver over the communications channel established for the second transceiver; and
transmitting, from the first transceiver, the proposed communication parameters for the second transceiver.

3. The method of claim 2, further comprising:
receiving, by the first transceiver, an acceptance of the proposed communication parameters; and
initiating independent communication between the second transceiver and a respective transceiver within the remote transceiver.

4. The method of claim 1, wherein obtaining a set of handshake information transferred during the initialization process, comprises requesting, by the first transceiver and from the second transceiver, the set of handshake information of the second transceiver, wherein the request includes a time period specifying an amount of time for the second transceiver to transmit the set of handshake information.

5. The method of claim 4, further comprising requesting, in parallel with the request from the second transceiver and from a third transceiver, a second different set of handshake information of the third transceiver.

6. The method of claim 1, wherein the handshake information comprises parameters for establishing data transfer protocols between two or more transceivers.

7. A system, comprising:
a diplexer;
a first transceiver connected to the diplexer, wherein the first transceiver users a given set of tones to perform an initialization process; and
a second transceiver connected to the diplexer, wherein the second transceiver also uses the given set of tones to perform the initialization process, the second transceiver and the first transceiver both communicate over a same physical communications medium, and the second transceiver performs operations comprising:

launching an initialization process, wherein the initialization process uses the given set of tones to perform the initialization process;

obtaining, from the first transceiver, a set of handshake information transferred by the first transceiver during the initialization process;

inserting the set of handshake information of the first transceiver into one or more registers that are transmitted with second handshake information of the second transceiver during initialization of the second transceiver; and initiating a communications channel for the first transceiver over the same physical communications medium that is connected to the diplexer using the set of handshake information that was inserted into the one or more registers, including transmitting the second handshake information of the second transceiver together with the set of handshake information for the first transceiver over the same physical communications medium using the diplexer and using the given set of tones.

8. The system of claim 7, wherein initiating a communications channel for the first transceiver over the same physical communications medium, comprises:

receiving a reply to the second handshake information that includes a different set of handshake information for the first transceiver, wherein the different set of handshake information is included in the one or more registers that are transmitted with the second handshake information used to initialize the second transceiver;

determining, based on the set of handshake information and the different set of handshake information, proposed communication parameters that the first transceiver will use to communicate with a remote transceiver over the communications channel established for the first transceiver; and transmitting, from the second transceiver, the proposed communication parameters for the first transceiver.

9. The system of claim 8, wherein the second transceiver performs operations comprising:

receiving an acceptance of the proposed communication parameters; and initiating independent communication between the first transceiver and a respective transceiver within the remote transceiver.

10. The system of claim 7, wherein obtaining a set of handshake information transferred during the initialization process, comprises requesting from the first transceiver, the set of handshake information of the first transceiver, wherein the request includes a time period specifying an amount of time for the first transceiver to transmit the set of handshake information.

11. The system of claim 10, wherein the second transceiver perform operations further comprising requesting, in parallel with the request from the first transceiver and from a third transceiver, a second different set of handshake information of the third transceiver.

12. The system of claim 7, wherein the handshake information comprises parameters for establishing data transfer protocols between two or more transceivers.

13. A non-transitory computer storage medium storing instructions that when executed by one or more data processing apparatus cause the one or more data processing apparatus to perform operations comprising:

launching an initialization process of a first transceiver, wherein the initialization process uses a given set of tones to perform the initialization process;

obtaining, for a second transceiver that is connected to a same physical communications medium as the first transceiver and uses the given set of tones to perform the initialization process, a set of handshake information transferred by the second transceiver during the initialization process;

inserting the set of handshake information of the second transceiver into one or more registers that are transmitted with first handshake information of the first transceiver during initialization of the first transceiver; and initiating a communications channel for the second transceiver over the same physical communications medium using the set of handshake information that was inserted into the one or more registers, including transmitting the first handshake information of the first transceiver together with the set of handshake information for the second transceiver over the same physical communications medium using the given set of tones.

14. The non-transitory computer storage medium of claim 13, wherein initiating a communications channel for the second transceiver over the same physical communications medium, comprises:

receiving a reply to the first handshake information that includes a different set of handshake information for the second transceiver, wherein the different set of handshake information is included in the one or more registers that are transmitted with the first handshake information used to initialize the first transceiver;

determining, based on the set of handshake information and the different set of handshake information, proposed communication parameters that the second transceiver will use to communicate with a remote transceiver over the communications channel established for the second transceiver; and transmitting the proposed communication parameters for the second transceiver.

15. The non-transitory computer storage medium of claim 14, wherein the instructions cause the one or more data processing apparatus to perform operations further comprising:

receiving an acceptance of the proposed communication parameters; and initiating independent communication between the second transceiver and a respective transceiver within the remote transceiver.

16. The non-transitory computer storage medium of claim 13, wherein obtaining a set of handshake information transferred during the initialization process, comprises requesting, from the second transceiver, the set of handshake information of the second transceiver, wherein the request includes a time period specifying an amount of time for the second transceiver to transmit the set of handshake information.

17. The non-transitory computer storage medium of claim 16, wherein the instructions cause the one or more data processing apparatus to perform operations further comprising requesting, in parallel with the request from the second transceiver and from a third transceiver, a second different set of handshake information of the third transceiver.

18. The non-transitory computer storage medium of claim 13, wherein the handshake information comprises parameters for establishing data transfer protocols between two or more transceivers.

* * * * *

UNITED STATES PATENT AND TRADEMARK OFFICE
CERTIFICATE OF CORRECTION

PATENT NO. : 10,291,382 B2
APPLICATION NO. : 15/786729
DATED : May 14, 2019
INVENTOR(S) : Fred Tze-Yu Chu Page 1 of 1

It is certified that error appears in the above-identified patent and that said Letters Patent is hereby corrected as shown below:

In the Claims

In Column 12, Line 62, in Claim 7, delete "users" and insert -- uses --, therefor.

Signed and Sealed this
Ninth Day of July, 2019

Andrei Iancu
*Director of the United States Patent and Trademark Office*